Patented Nov. 30, 1948

2,455,015

UNITED STATES PATENT OFFICE 2,455,015

MEANS FOR IGNITING PROPELLANT IN ROCKET MOTORS

Harry W. Mace, Glendale, and Beverly H. Chamberlain, Pasadena, Calif., assignors to Aerojet Engineering Corporation, Azusa, Calif., a corporation of Delaware Application January 3, 1946, Serial No. 638,742

5 Claims. (Cl. 60—35.6)

This invention relates to jet propulsion and more particularly to means for igniting the propellant in a rocket motor.

The principal object of this invention is to provide a simple and reliable means for creating ignition over a large surface of the propellant.

In the co-pending application of John W. Parsons, Serial No. 589,795, filed April 23, 1945, and assigned to the assignee as the present application, there is described and claimed an arrangement of the propellant substance in the combustion chamber of a rocket motor wherein so-called pans or receptacles are used to contain the propellant substance. The pans are preferably made relatively flat and extend substantially throughout the length of the combustion chamber so that a large surface of the propellant is exposed for burning. It may sometimes be desired to use more than one pan for propellant in order to increase the effective burning area, inasmuch, as the propulsive thrust which may be generated by a rocket motor is dependent on the burning area.

It is a problem in such a rocket motor to ignite the propellant, as it is desired that ignition shall take place over substantially the entire burning surface, practically instantaneously. According to our invention we create the desired ignition over the entire surface of the propellant by providing means for sending a heavy flame over all exposed propellant surfaces. We carry this out by providing within the chamber a charge of a readily combustible material such as black powder. This material may be arranged, for example, in the form of a flat disc or plate and placed in a convenient position within the chamber so that it may receive the flame from an externally operated ignitor. The ignitor may be of any suitable form providing a local hot flame sufficient to ignite the combustible substance. While the flame from the ignitor would not be sufficient to extend over all surfaces of the propellant, the disc or plate of combustible substance will produce the desired flame over all the propellant surfaces.

Our invention will be better understood from the following detailed description and accompanying drawings of which:

Figure 1:
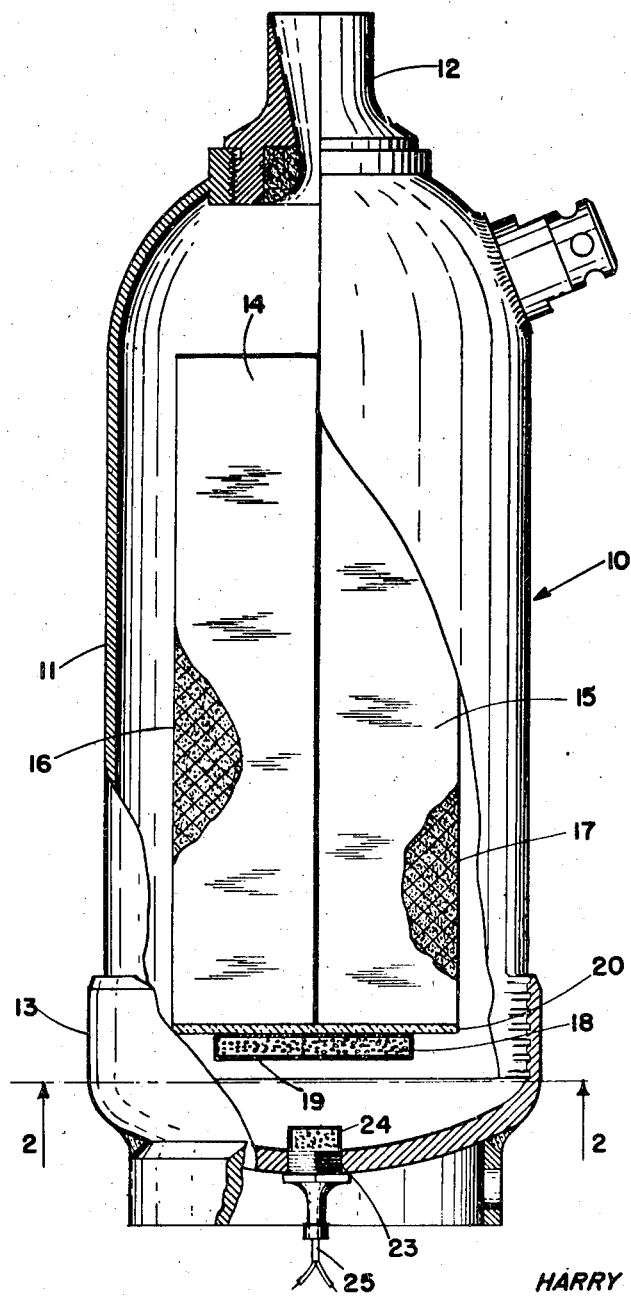
Fig. 1 shows a longitudinal cross section of a rocket motor containing solid propellant material adapted to be ignited according to our invention.
Figure 2:
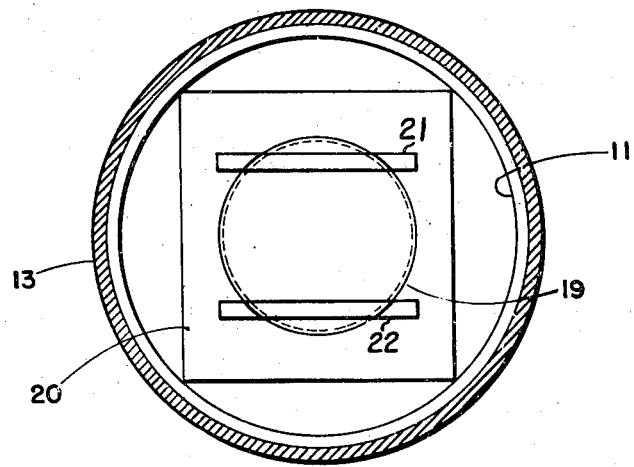
Fig. 2 is a cross section view taken at line 2—2 of Fig. 1.
Figure 3:
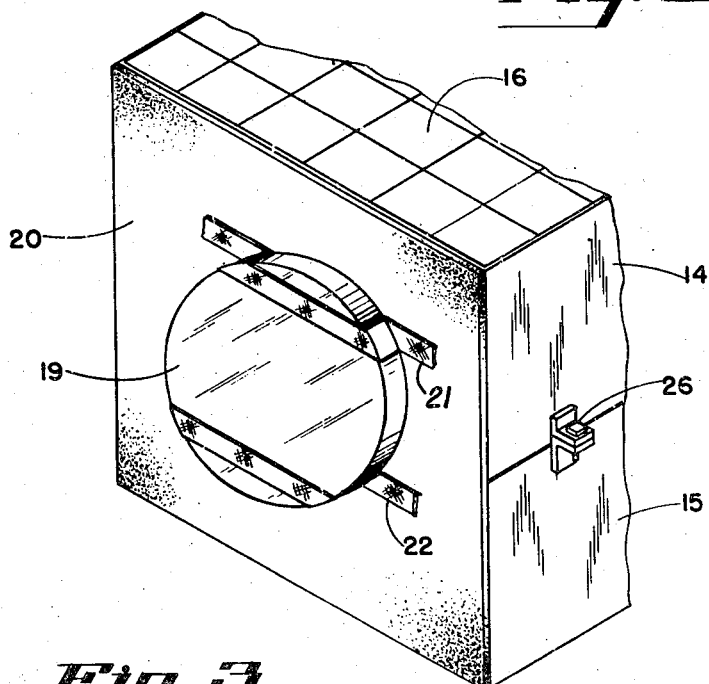
Fig. 3 is a detail view of the construction of Fig. 1.

In the drawings there is shown a rocket motor 10 comprising a cylindrical chamber portion 11 terminating at one end in a nozzle 12 through which the exhaust gases escape. At the opposite end the cylindrical chamber is closed by a head member 13 threaded to the chamber. There is placed within the chamber a pair of flats or containers 14 and 15 filled with a propellant substance of a type suitable for operating a rocket motor. A suitable propellant, for example, is a mixture of a fuel and an oxidizer for burning the fuel. The fuel may, for example, be an asphalt, and the oxidizer may be a substance such as potassium perchlorate finely divided and uniformly mixed throughout the asphalt. Such a mixture is a solid thermoplastic substance which can be poured into the pans or flats while hot and allowed to solidify while cooling.

The pans are placed back to back and may be fastened together by a fastener 26. In this way the propellant surfaces 16 and 17 are exposed. These surfaces 16 and 17 constitute the burning surfaces of the propellant and the burning should occur uniformly throughout all parts of the surfaces so that the burning occurs in horizontal layers of the propellant in the pans until the propellant is all consumed. In this way uniform gas pressure is built up in the chamber, providing a uniform thrust at the nozzle.

In order to ignite all parts of the propellant surfaces simultaneously, we provide a disc of a highly inflammable material at the ends of the pans at the head end of the chamber. The disc may, for example, comprise a charge of ordinary black powder 18 encased by a wrapping 19 of cellulose nitrate. The attaching arrangement for the disc, shown in the drawings, comprises an asbestos sheet 20 placed over the ends of the pans; and the disc 19 can be attached to the asbestos sheet in a suitable manner, for example, by the tapes 21 and 22.

To ignite the disc 19 we provide a suitable ignitor which will direct a hot flame against the disc when it is desired to set the motor into operation. The ignitor may be of a suitable form fitted through the center of the head 13 so that the flame will impinge on the disc. The ignitor may, for example, comprise a plug 23 fitted through the head 13 and having fitted within its inside end a container 24 of black powder or the like. Electric wires 25 passing through the plug connect with an igniting element such as a hot wire, to ignite the powder.

In operation it is only required to send electrical current through the ignition wire of the ignitor to set off the ignitor charge which directs its flame against disc 18. The material of the disc 18 is sufficiently inflammable to create a hot flame filling the spaces within the combustion chamber 11 thereby producing sufficient heat at surfaces 16 and 17 to ignite the propellant.

Our invention is not limited to the particular form shown. For example, we may ignite any desired number of propellant surfaces such as one or more. The inflammable substance 18 may be of any suitable shape and need not necessarily be attached to the containers; as it is only required that it be placed in relation to the flame from the ignitor.

We claim:

1. In a rocket motor of the type having a tubular combustion chamber with a nozzle at one end of the chamber and the chamber being closed at the other end, a container containing propellant within the chamber with the exposed surface of the propellant facing the wall of the chamber, an inflammable substance placed at the end of the container adjacent the closed end of the chamber, and an ignitor placed through the closed end so that the heat from the ignitor ignites the inflammable substance causing flame to carry to the propellant surface.

2. Apparatus according to claim 1 in which the inflammable substance is contained within an inflammable envelope.

3. Apparatus according to claim 1 in which the inflammable substance is a powder placed within a disc-like envelope of inflammable material, said envelope being fastened to the end of the container.

4. In a rocket motor of the type comprising a combustion chamber which is closed except for an exhaust nozzle at one end of the chamber, a container containing solid propellant within the chamber, the container having a side which covers the propellant and having an open side which leaves an exposed propellant surface facing a wall of the chamber, an inflammable substance attached to said covering side, and an ignitor placed through the chamber so that heat from the ignitor ignites the inflammable substance, causing flame to carry to the exposed propellant surface.

5. In a rocket motor of the type comprising a combustion chamber which is closed except for an exhaust nozzle at one end of the chamber, a box containing solid propellant within the chamber, the box having sides which hold the propellant within them, there being some space between the sides and the inner wall of the chamber, the propellant having an exposed surface facing the chamber wall with space between the chamber wall and the surface, an inflammable substance attached to one of the sides, and an ignitor placed through the chamber and arranged adjacent the substance so that heat from the ignitor ignites the inflammable substance, causing flame to carry to the exposed propellant surface.

HARRY W. MACE.
BEVERLY H. CHAMBERLAIN.

REFERENCES CITED

The following references are of record in the file of this patent:

UNITED STATES PATENTS

| Number | Name | Date |
|---|---|---|
| 2,395,435 | Thompson et al. | Feb. 26, 1946 |

FOREIGN PATENTS

| Number | Country | Date |
|---|---|---|
| 427,951 | France | June 10, 1911 |
| 831,496 | France | June 7, 1938 |